United States Patent
Abari et al.

(10) Patent No.: US 11,868,140 B2
(45) Date of Patent: Jan. 9, 2024

(54) AUTONOMOUS-VEHICLE DISPATCH BASED ON FLEET-LEVEL TARGET OBJECTIVES

(71) Applicant: Lyft, Inc., San Francisco, CA (US)

(72) Inventors: Farzad Cyrus Foroughi Abari, San Bruno, CA (US); Aaron Jacob Levine Friedman, San Francisco, CA (US); John Houston, Los Altos, CA (US); Adam Hart Reis, San Francisco, CA (US); Alexander Thomas Starns, Menlo Park, CA (US)

(73) Assignee: Lyft, Inc., San Francisco, CA (US)

( * ) Notice: Subject to any disclaimer, the term of this patent is extended or adjusted under 35 U.S.C. 154(b) by 464 days.

(21) Appl. No.: 17/019,911

(22) Filed: Sep. 14, 2020

(65) Prior Publication Data

US 2021/0064058 A1 Mar. 4, 2021

Related U.S. Application Data

(63) Continuation of application No. 15/852,914, filed on Dec. 22, 2017, now Pat. No. 10,775,806.

(51) Int. Cl.
| | |
|---|---|
| *G05D 1/02* | (2020.01) |
| *G01C 21/34* | (2006.01) |
| *G06Q 30/06* | (2023.01) |
| *G06Q 10/063* | (2023.01) |
| *G06Q 10/00* | (2023.01) |
| *G06Q 50/30* | (2012.01) |

(Continued)

(52) U.S. Cl.
CPC ........... *G05D 1/0291* (2013.01); *G01C 21/34* (2013.01); *G01C 21/3438* (2013.01); *G06Q 10/00* (2013.01); *G06Q 10/02* (2013.01); *G06Q 10/063* (2013.01); *G06Q 30/0207* (2013.01); *G06Q 30/06* (2013.01); *G06Q 50/30* (2013.01)

(58) Field of Classification Search
CPC ...... G05D 1/0291; G01C 21/34; G06Q 10/02; G06Q 10/063; G06Q 30/0207; G06Q 50/30
USPC ........................................................... 701/25
See application file for complete search history.

(56) References Cited

U.S. PATENT DOCUMENTS

| | | | |
|---|---|---|---|
| 9,940,840 B1* | 4/2018 | Schubert | G01C 21/3407 |
| 10,308,430 B1* | 6/2019 | Brady | G05D 1/0022 |
| 2016/0335576 A1* | 11/2016 | Peng | G06Q 10/06315 |

(Continued)

*Primary Examiner* — Krishnan Ramesh
(74) *Attorney, Agent, or Firm* — Baker Botts L.L.P.

(57) ABSTRACT

In one embodiment, a method includes determining a fleet-level objective for a vehicle associated with instructing the vehicle to travel a route according to route criteria based on the fleet-level objective. The method includes receiving a ride request from a ride requestor associated with ride criteria including a pick-up location and a drop-off location. The method includes determining that the ride requestor is a passenger for the vehicle to satisfy the fleet-level objective contingent on modifications to the ride criteria. The method includes providing incentives to the ride requestor contingent on acceptance of the modifications to the ride criteria. The method includes, after receiving the acceptance of the modifications to the ride criteria, modifying the ride criteria in accordance with the route criteria. The method includes instructing the vehicle to transport the ride requestor based on the modified ride criteria so as to fulfill the fleet-level objective.

20 Claims, 5 Drawing Sheets

(51) Int. Cl.
*G06Q 30/0207* (2023.01)
*G06Q 10/02* (2012.01)

(56) References Cited

U.S. PATENT DOCUMENTS

| | | | |
|---|---|---|---|
| 2017/0184411 A1* | 6/2017 | Glasgow | G01C 21/3484 |
| 2018/0059687 A1* | 3/2018 | Hayes | G05D 1/0217 |
| 2018/0096606 A1* | 4/2018 | Moreira-Matias | G05D 1/0291 |
| 2018/0202822 A1* | 7/2018 | DeLizio | B60R 25/24 |
| 2018/0211541 A1* | 7/2018 | Rakah | G08G 1/148 |
| 2018/0224866 A1* | 8/2018 | Alonso-Mora | G05D 1/0291 |
| 2018/0231984 A1* | 8/2018 | Alonso-Mora | G06Q 10/0631 |
| 2018/0315146 A1* | 11/2018 | Matthiesen | G01C 21/3453 |
| 2018/0321688 A1* | 11/2018 | Chase | G05D 1/0022 |
| 2018/0342113 A1* | 11/2018 | Kislovskiy | G07C 5/008 |
| 2018/0373268 A1* | 12/2018 | Antunes Marques Esteves | H04W 4/023 |
| 2019/0051061 A1* | 2/2019 | Battles | G07C 5/08 |
| 2019/0057481 A1* | 2/2019 | Zhang | G06Q 10/047 |
| 2019/0066409 A1* | 2/2019 | Moreira da Mota | G07C 5/0808 |
| 2019/0154453 A1* | 5/2019 | Leone | B60W 30/188 |
| 2019/0179336 A1* | 6/2019 | Colijn | G06Q 10/04 |
| 2019/0278298 A1* | 9/2019 | Pedersen | G05D 1/0038 |
| 2019/0294159 A1* | 9/2019 | Pedersen | G05D 1/0038 |

* cited by examiner

AUTONOMOUS-VEHICLE DISPATCH BASED ON FLEET-LEVEL TARGET OBJECTIVES

PRIORITY

This application is a continuation under 35 U.S.C. § 120 of U.S. patent application Ser. No. 15/852,914, now U.S. Pat. No. 10,775,806, filed 22 Dec. 2017.

BACKGROUND

A transportation management system, in response to transportation requests, may match the needs of transportation requestors with transportation providers. For instance, through a transportation application installed on a mobile device, a transportation requestor may request for transportation from a starting location to a destination at a particular time. In response to the request, the transportation management system may match the transportation requestor's needs with an available transportation provider and instruct the transportation provider to transport the requesting party from the specified starting location to the desired destination.

Conventional transportation management systems may respond to requests for transportation by dispatching vehicles with human drivers. In such systems, the human drivers typically manage maintenance and cleaning of the vehicles they drive, and use their own judgment to determine where to be geographically to optimize personal objectives (e.g., servicing the most transportation requests or stay within a region close to home). With technological progress in autonomous vehicles, transportation services may dispatch autonomous vehicles instead of human-driven vehicles to fulfill transportation requests. The capabilities of autonomous vehicles, however, are generally limited to driving autonomously from one location to another. In other words, autonomous vehicles are generally not configured to handle tasks outside of driving and navigating, especially tasks that serve fleet-level objectives. As such, a transportation management system that manages autonomous vehicles may involve more than matching and dispatching autonomous vehicles to fulfill transportation requests.

DESCRIPTION OF EXAMPLE EMBODIMENTS

Figure 1:
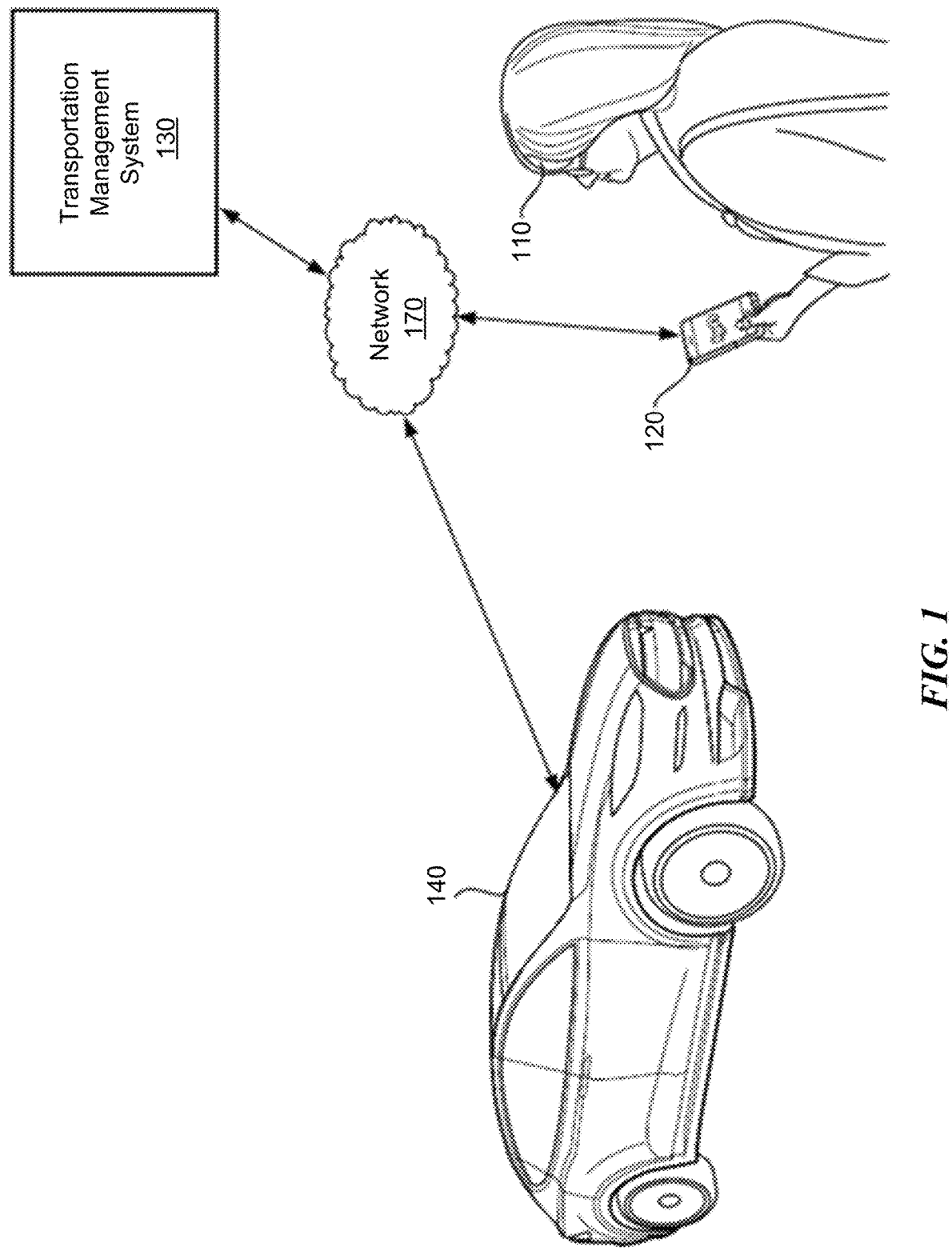
FIG. 1 illustrates an example of a transportation management system for matching ride requestors with ride providers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

A transportation management system, in addition to fulfilling ride requests, may also be responsible for fleet-management operations in accordance with embodiments described herein. Particular embodiments of the transportation management system may manage a fleet of autonomous vehicles tasked with servicing ride requestors needing transportation. While autonomous vehicles may be equipped and configured to drive autonomously with minimal or no human input, such vehicles are typically not autonomous when it comes to operations outside of driving. For example, individual autonomous vehicles in a fleet may not be equipped and/or configured to manage its own maintenance autonomously, much less doing so in a manner that would not negatively impact the fleet's overall quality of service. As another example, each vehicle within a fleet may lack a global view of the fleet's status and objectives, and therefore may not recognize nor act in response to global issues such as suboptimal fleet distribution over service regions. The transportation management system in particular embodiments address such issues by providing a system-wide, fleet-level management architecture.

In particular embodiments, the transportation management system may be configured to advance certain global objectives of the fleet, such as meeting a quality-of-service standard for servicing ride requests, ensuring that each vehicle is properly maintained/serviced without disrupting the system's overall quality-of-service in meeting ride demand, optimizing fleet distribution across service regions to meet anticipated ride demands in those regions, and any other suitable considerations. To further certain such fleet-level objectives, the transportation management system may instruct particular autonomous vehicles to drive to prescribed destinations, such as driving to a service center to undergo maintenance or relocate to a different service region so that each service region is serviced by an optimal number of autonomous vehicles. When a vehicle is instructed as such to further a fleet-level objective rather than serving ride requests, it may be considered as being taken offline, which is undesirable from the perspectives of both the ride requestors and the fleet.

Particular embodiments described herein relate to systems and methods for enabling autonomous vehicles to continue to fulfill ride requests while advancing particular target objectives. As used herein, the term "target objective" refers to an objective of an autonomous vehicle that is not directly related to transporting passengers or fulfilling a particular ride request. A target object of an autonomous vehicle in a fleet of vehicles may be a fleet-level objective that benefits the fleet as a whole, such as ensuring that each vehicle in the fleet is properly maintained/repaired or maintaining an optimal vehicle distribution across various service regions. A target object of an autonomous vehicle may be associated with reaching a particular destination, which may be determined by the transportation management system or the autonomous vehicle, that is unrelated to any ride request. The target objective of a vehicle may be, for example, reaching a service center by a scheduled service time, a region serviced by a service center, or a region with anticipated demand for transportation. For example, during the course of an autonomous vehicle's operation, the transportation management system may determine that the vehicle needs to be serviced. For example, the vehicle may need fuel (as used herein, the term "fuel" includes any type of energy source for the vehicle, including electricity, gasoline, diesel, fuel cell, etc.), cleaning, re-calibration, new brakes, or any other repair or maintenance service performed. However, unless the vehicle cannot drive autonomously or is unsafe to transport passengers, it would be more beneficial for the fleet to have it continue servicing passengers while en route to a service center (e.g., a vehicle repair or maintenance facility or service technician), rather than being taken offline and driving without any passengers. Thus, when dispatching the vehicle to fulfill ride requests, the system may take into consideration whether fulfilling the particular ride requests would get the vehicle closer to a target service center, for example. In this example, getting the vehicle to a service center may be considered as a target objective of the system. In another example, the target objective may be to relocate vehicles in the fleet managed by the transportation management system to achieve a desired distribution of vehicles. Again, rather than taking the vehicles out of commission while they are relocating, the transportation management system may selectively dispatch vehicles to service requests in a strategic manner to advance the target objective of achieving the desired distribution. For example, an autonomous vehicle may be dispatched from one region to a request in a different region in order to rebalance the fleet even though the dispatched autonomous vehicle is further from the request than autonomous vehicles in the region to be rebalanced.

FIG. 1 illustrates an example of a transportation management system 130 for matching ride requestors 110 with autonomous vehicles 140, in accordance with particular embodiments described herein. In particular embodiments, the requestor 110 may use a transportation application running on a requestor computing device 120 to request a ride from a specified pick-up location to a specified drop-off location. The request may be sent over a communication network 170 to the transportation management system 130. The ride request may include request information, which may include, for example, an identifier associated with the requestor 110 and/or the requestor computing device 120, user information associated with the requestor 110, a location of the requestor computing device 120 at the time of the request, a requested time for the ride (e.g., at a scheduled future time or an instant/current time), and/or any other relevant information for matching the ride request with a suitable autonomous vehicle 140.

In response to a ride request, the transportation management system 130 may identify a suitable autonomous vehicle 140 to service the ride request. The transportation management system 130 may locate candidate autonomous vehicles 140 that are available (e.g., not currently transporting other passengers) and in the general vicinity of the requested pick-up location (e.g., based on GPS data provided by the autonomous vehicles 140 and the requestor computing device 120). The transportation management system 130 may match the ride request with a suitable autonomous vehicle 140 based on information pertaining to each autonomous vehicle 140 candidate. In particular embodiments, certain immutable information pertaining to a vehicle (e.g., capacity, features, amenities, and/or limitations of the vehicle) may be persisted with the transportation management system 130, and other variable information (e.g., current status or condition, etc.) may be sent to the transportation management system 130 periodically. For instance, autonomous vehicles 140 may send, via a network 170, its current location, self-diagnostic information (e.g., gas level, battery level, engine status, etc.), sensor data, and/or any other suitable information that would facilitate an informed match to be made. In particular embodiments, the transportation management system 130 may select any number of suitable autonomous vehicles 140 that best match the needs of the ride requestor 110. In particular embodiments, the transportation management system 130 may provide the ride requestor 110 information pertaining to the selected autonomous vehicles 140, such as their respective locations, features, conditions, limitations, and any other information that may be of interest to the ride requestor 110. In embodiments where multiple autonomous vehicles 140 are presented for selection, the ride requestor 110 may select a desired autonomous vehicle 140. In other embodiments, the transportation management system 130 may make the selection on behalf of the ride requestor 110. Once a match has been finalized, the autonomous vehicle 140 and the requestor 110 may each receive relevant transport information. For example, the autonomous vehicle 140 may receive information such as the requested pick-up and drop-off locations, suggested route or navigation instructions, current location tracking information for the ride requestor 110, profile information associated with the ride requestor 110 to personalize the ride experience, and any other relevant information. The ride requestor 110, on the other hand, may receive information such as the autonomous vehicle's 140 current location, identifying characteristics (e.g., color, make and model, etc.), capabilities, features, amenities, and/or any other suitable information. In this manner, the transportation management system 130 may dynamically match ride requestors 110 and autonomous vehicles 140 that are distributed throughout a geographic area.

Figure 2:
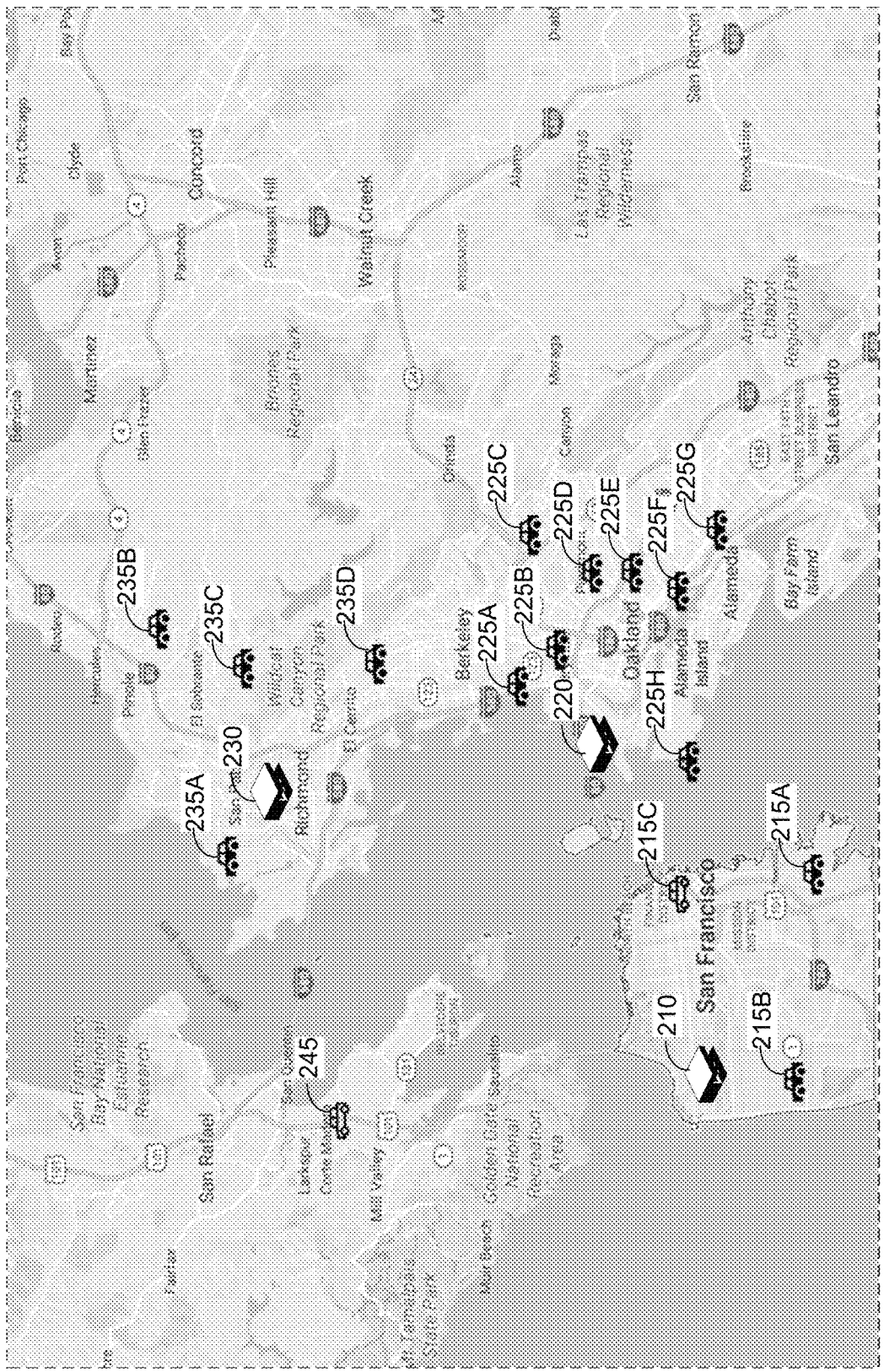
FIG. 2 illustrates an example scenario where autonomous vehicles are not optimally distributed in a geographic region.

FIG. 2 illustrates an example scenario 200 where autonomous vehicles 215A-C, 225A-H, 235A-D, 245 managed by a transportation management system are not optimally distributed in a geographic region. In the depicted scenario 200, the Oakland region has a large concentration of autonomous vehicles 225A-H. This may have occurred, for example, due to a sporting event occurring in Oakland. In contrast, the San Francisco region has a relatively smaller concentration of autonomous vehicles 215A-C, and the Richmond region similarly has a smaller concentration of autonomous vehicles 235A-D.

The distribution shown in FIG. 2 may be suboptimal for several reasons. In one example, the transportation management system may know that, based on historical data, demand for transportation services in San Francisco is much higher than anywhere else in the Bay Area. As such, from the standpoint of meeting the expected demand and shortening wait times in San Francisco, it would be more optimal to have a higher concentration of vehicles in San Francisco and relatively lower concentrations of vehicles in the other regions. Thus, to achieve the desired distribution, the transportation management system, according to particular embodiments, may instruct vehicles in saturated regions (e.g., where the supply of autonomous vehicles exceeds expected transportation demand) to relocate to under-served regions (e.g., where expected transportation demand exceeds supply). As an example, in the scenario 200 shown in FIG. 2, the transportation management system may instruct some of the autonomous vehicles 225A-H in Oakland (e.g., five of the eight vehicles) to relocate to San Francisco.

Another potential issue with the vehicle distribution shown in FIG. 2 is that service centers 210, 220, 230 are either under or over utilized. In the example shown, San Francisco, Oakland, and Richmond have respective service centers 210, 220, 230 for servicing or maintaining the fleet of autonomous vehicles 215A-C, 225A-H, 235A-D, 245. The service centers 210, 220, 230 may provide service to vehicles in their respective regions (e.g., it may be more efficient for autonomous vehicles to obtain service from nearby service centers). Furthermore, the service centers 210, 220, 230 may each have a certain service capacity, beyond which service may be delayed. Delayed or prolonged service time, in turn, may affect the overall utilization of the autonomous vehicles, which means the fleet may be operating suboptimally. As the number of autonomous vehicles waiting to be serviced increases, the supply of vehicles available to service ride requests decreases, which may negatively affect the overall ride experience for ride requestors. In the example scenario 200, assuming that each of the service centers 210, 220, 230 has capacity to service five vehicles within its region, the San Francisco service center 210 and the Richmond service center 230 are both underutilized, while the Oakland service center 220 is over utilized. Thus, according to particular embodiments, the transportation management system may, for example, instruct two of the eight vehicles 225A-H in Oakland to relocate to the San Francisco region, and one of the eight vehicles 225A-H in Oakland to relocate to the Richmond region.

Aside from managing fleet distribution, the transportation management system may further manage the maintenance and service requirements of the autonomous vehicles. In particular embodiments, the transportation management system may keep track of routine maintenance schedules of the autonomous vehicles and determine that a particular autonomous vehicle, such as autonomous vehicle 245, is to be serviced. Based on the autonomous vehicle's 245 service needs (e.g., sensor re-calibration, oil change, fluid replacements, tire change/rotation, or any other service needs), the transportation management system may determine which service center should the vehicle 245 be assigned to. In particular embodiments, the transportation management system may determine that both service centers 210, 230 are suitable candidates based on their respective capabilities, availabilities, and proximities to the vehicle 245. For each of the service centers 210, 230, the transportation management system may compute a matching score based on information known about that service center (e.g., capabilities, capacity, parts inventory, predicted availability when the vehicle 245 is projected to arrive, distance from the vehicle 245, costs for performing the needed services, and any other suitable information) and information about the vehicle 245 (e.g., the type of services needed, make and model of the vehicle 245, maximum travel range based on remaining battery or fuel level, and any other suitable information). The transportation management system may also take into consideration predicted transportation demand in the regions serviced by the service centers 210, 230. For example, the transportation management system may determine that although both the San Francisco service center 210 and the Richmond service center 230 are good matches for the autonomous vehicle 245, the San Francisco service center 210 is preferable because the vehicle 245, after being serviced, could fulfil ride requests in the San Francisco region, which is likely to have higher transportation demand than Richmond. Once the San Francisco service center 210 has been selected, the transportation management system may send instructions to the autonomous vehicle 245 to drive to that service center 210 to be serviced.

In another example, an autonomous vehicle 215C may determine, based on its sensors, that it needs to be serviced. In particular embodiments, the service need may have varying degrees of urgency. Conditions requiring urgent service may include, for example, detection of a flat tire, faulty or nearly depleted battery (e.g. below 10 percent), inoperable or unreliable sensors, and any other condition that hampers the immediate or short-term operability and safety of the vehicle 215C. Less urgent conditions may include, for example, detection that the current battery level is approaching the nearly depleted level (e.g., between 10 to 30 percent), the vehicle is dirty, the accuracy of a sensor is degrading, tire pressure is low, and any other condition that, while not ideal, would still allow the vehicle 215C to operate safely for a sufficiently long duration and/or travel distance. In the example shown in FIG. 2, the autonomous vehicle 215C may have determined that it has a urgent service need. In response, the transportation management system may determine that the Oakland service center 220 is most suitable because the estimated time for vehicle 215C to get to the service center 220 is the shortest among the service center options available (e.g., the short travel time may be due to distance and/or traffic conditions). The transportation management system may, therefore, select the Oakland service center 220 even though the San Francisco service center 210 is physically closer and has more capacity than the Oakland service center 220. Once the selection is made, the transportation management system may instruct the autonomous vehicle 215C to drive to the Oakland service center 220 to be serviced.

As shown by the examples described above with reference to FIG. 2, the transportation management system, for various reasons, may instruct an autonomous vehicle to drive to a location to fulfil a target object that is not directly related to fulfilling ride requests (e.g., helping with redistribution of the fleet or going to a service center to be repaired). When the autonomous vehicle drives to the designated destination without any passengers, it may be considered as being offline, as it is not fulfilling ride requests. The amount of time that the vehicle spends offline diminishes the vehicle's overall utilization. Furthermore, having less vehicles in the fleet to service ride requests may also negatively impact the fleet's quality of service and ridership experience. Thus, it is desirable to minimize the amount of time that vehicles spend offline. Particular embodiments described herein are aimed at allowing autonomous vehicles to remain productive, in terms of servicing ride requests, while advancing towards their respective target objectives. According to particular embodiments, the transportation management system may match an autonomous vehicle with a ride request that is aligned with the vehicle's target destination objective, such as reaching a service center, relocating to another geographic region to help load-balance a fleet with respect to geographic regions, or any other type of target objective of the system.

Figure 3:
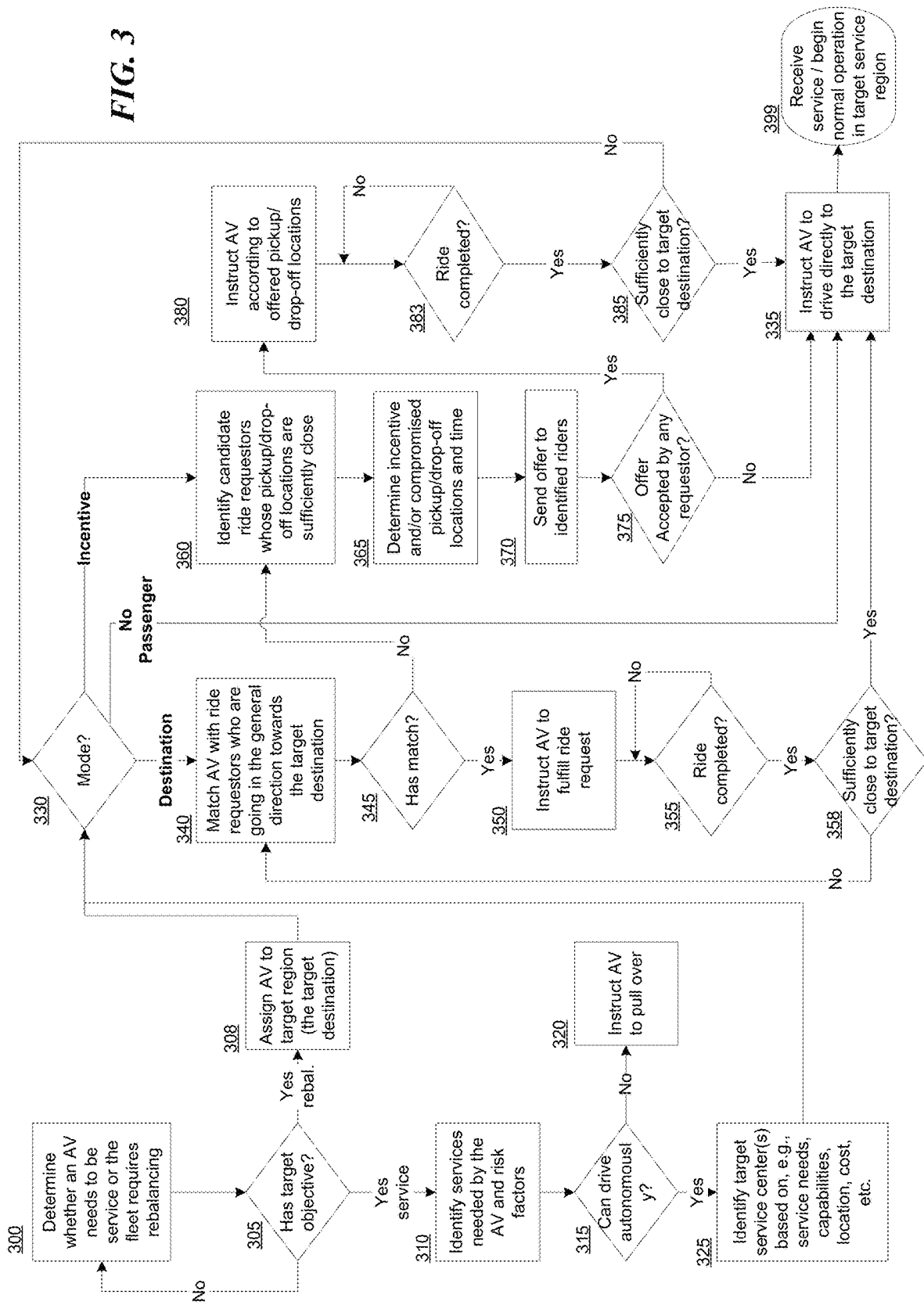
FIG. 3 illustrates an example of a method for distributing autonomous vehicles to advance target objectives.

FIG. 3 illustrates an example method for dispatching autonomous vehicles to fulfill ride requests while advancing target objectives that are not directly related to the particular ride requests being fulfilled. In particular, FIG. 3 illustrates an embodiment where a target objective is to get an autonomous vehicle to a service center, and another embodiment where the target objective is to adjust vehicle distribution within service regions. The system may dispatch vehicles in different ways to advance the target objectives. For instance, in particular embodiments an autonomous vehicle may be matched with a ride request that would result in the vehicle being closer to the target destination at the completion of the requested ride. In particular embodiments, the transportation management system may present offers to ride requestors to incentivize them to accommodate a vehicle's target objective. For example, a discount may be offered to ride requestors who are willing to wait a bit longer or walk a short distance for a particular vehicle with a target objective.

The method may begin at step 300, where a transportation management system, which may be communicatively coupled to a fleet of autonomous vehicles (also referred to as "AVs") may determine whether any autonomous vehicle is to be serviced. In particular embodiments, the transportation management system may periodically query the autonomous vehicles or receive push-notification from the vehicles regarding their respective condition. For example, each autonomous vehicle may be configured to diagnose its own condition or detect any issues that should be addressed. For instance, a vehicle may, e.g., monitor its engine oil condition and estimate when it should be changed; determine whether tire pressure is appropriate using tire pressure monitoring technology; determine whether issues with the engine should be inspected; determine whether any fluid needs to be replenished or flushed (e.g., transmission fluid, brake fluid, steering fluid, coolant, etc.); detect when brake pads should be replaced; detect fuel level (e.g., remaining battery charge) and estimate the number of miles/kilometers the vehicle could travel with the remaining fuel; determine the condition of the battery; detect whether a sensor (e.g., LiDAR, camera, etc.) needs to be cleaned, re-calibrated, or repaired (e.g., the vehicle may compare sensor readings to a benchmark to determine whether it is performing suboptimally); detect whether vehicle needs to be cleaned (e.g., based on cameras, dust sensors, odor sensors, etc.); and any other conditions that may warrant being serviced at a service center.

In particular embodiments, the transportation management system and/or the vehicle may track the vehicle's maintenance schedule and determine that the next scheduled maintenance is approaching (e.g., the maintenance schedule may be based on time, distance driven, driving speed, or a combination of any of such factors). Based on any such information regarding the vehicle's condition, the transportation management system may determine, at step 305, whether a target objective of servicing the vehicle exists. If the condition of the vehicle does not yet need servicing (e.g., the vehicle is in good condition or the issue is minor and could wait), or if other considerations outweigh the need to service the vehicle at this moment (e.g., during a period of high demand for rides, servicing may be postponed), then the system may repeat step 300 for that vehicle at a later time and/or make similar determinations for other vehicles in the fleet.

Upon determining that servicing should be performed, the system may continue onto step 310 according to particular embodiments. There, the transportation management system may identify services needed by the autonomous vehicle. For example, based on self-diagnostic or other condition data provided by the vehicle and/or maintained by the transportation management system, the system may determine the types of service that may be needed (e.g., recharging, cleaning, re-calibrating the sensors, etc.). In certain embodiments, the transportation management system may draw a general conclusion as to whether service is needed without determining at that time the particular type of service needed. Additionally, the transportation management system may generate a risk factor score or any other indication of the level of risk of operating the vehicle given its current state. For example, the risk factor score may be generated by inputting quantifiable measures of the vehicle's condition data into an algorithm or rules engine. The algorithm or rules engine may, for instance, apply different weights to each of the quantifiable measures to generate a final risk assessment. For example, tire pressure, fluid level, and engine oil may be given low weights since their sub-optimal conditions may not be strongly correlated with a heightened or serious risk of vehicle failure. On the other hand, malfunctioning navigation sensors, worn out brake pads, and any other serious conditions may be more heavily weighted. In particular embodiments, the risk factor score may also be generated using a machine-learning model. For example, a machine-learning model may be trained to generate a risk factor score. The machine-learning model (e.g., a neural network or any other suitable types of machine-learning model) may be trained on a labeled training data set. Each data sample may include various quantifiable measures of the vehicle's condition (e.g., oil level, fuel level, brake-pad condition, sensor cleanliness or calibration condition, etc.), as well as one or more labels indicating whether the vehicle broke down or a measure of seriousness of a resulting accident or situation. Based on such training data, the machine-learning model may learn which vehicle conditions or combination of vehicle conditions may signal a heightened risk of operation.

At step 315, the transportation management system may make an assessment as to whether the autonomous vehicle should continue to drive autonomously. The assessment may be based on the risk factor score generated in step 310 and/or any other assessment based on particular sensor or equipment conditions. For example, a camera may be impaired if images taken by it are: insufficiently sharp (e.g., lanes can no longer be discerned from the images), consistently and largely depicting the same pixels despite vehicle movement (e.g., which may be due to dirt or other objects on the lens), or significantly different from images taken by another camera of the vehicle. As another example, a LiDAR may be impaired it cannot rotate as intended or its readings significantly and consistently deviate from what is expected based on a preexisting HD map. Additional problems that may prevent the vehicle from driving may include, e.g., a flat tire, failed battery, depleted fuel, failed engine, and any other mechanical or electrical failure. In particular embodiments, the autonomous vehicle itself may make an assessment as to whether it should continue to drive. If the assessment is that the autonomous vehicle should not be driving, then at 320 the vehicle may be instructed (by either the transportation management system or the vehicle itself) to pull over and stop operating. In particular embodiments, the transportation management system and/or the vehicle may also signal for assistance (e.g., call a field technician to address the issue). If instead the assessment is that the autonomous vehicle may continue to drive autonomously, then the process may continue to step 325, in particular embodiments.

At step 325, the transportation management system may identify candidate service center(s) (including service facilities and individual service technicians) for servicing the autonomous vehicle. Some service centers (referred to as "affiliated service centers") may be owned and/or managed by the same entity that owns and/or manages the transportation management system, and other service centers may be third-party service centers that are unaffiliated with the transportation management system or the associated entity. The service centers may be selected based on a variety of factors, such as proximity between each of the candidate service centers and the autonomous vehicle (e.g., only service centers that are within a threshold distance and/or travel time would be considered). In particular embodiments, the ride-service center may further refine the selection based on, e.g., whether the service center's capabilities or offered services match the needs of the vehicle and whether the service center is available or has capacity when the vehicle is expected to arrive. Such information may be provided by service centers to the transportation management system and may be periodically updated. In particular embodiments, the transportation management system may further have access to each service center's service pricing and/or other measures of the center's quality of service (e.g., ratings, speed, etc.).

The information associated with the autonomous vehicle and the service centers may be factored into the process for selecting candidate service centers. In particular embodiments, needs of the vehicle may be matched with each service center's availability, capability, distance, and/or cost of servicing the autonomous vehicle. In particular embodiments, the system may first select a suitable affiliated service center to service an autonomous vehicle and then see whether having the vehicle serviced by any third-party service center would be more cost effective. For example, by matching the aforementioned information associated with candidate service centers with that of the vehicle, the transportation management system may select a candidate affiliated service center to potentially service the autonomous vehicle (e.g., the selected affiliated service center may be the closest affiliated service center that is available and/or capable of providing the requisite service). After selecting the candidate affiliated service center, the transportation management system or the autonomous vehicle may compute a baseline cost for having the vehicle serviced by that affiliated service center. The baseline cost may be based on, for example, the cost of being serviced at the affiliated service center (e.g., the cost of labor and parts) and/or the opportunity cost of driving to that service center. The opportunity cost may be the amount that could have been earned by the autonomous vehicle had it been servicing ride requests instead (e.g., in cases where autonomous vehicle drives to the service center directly without passengers) or had it been servicing ride requests at a discount (e.g. in cases where the autonomous vehicle drives to the service center in destination mode or incentive mode). Based on the baseline cost, the transportation management system may send offers to or solicit bids from third-party service centers. If the total cost of being serviced by a willing third-party service center (e.g., the total cost may also be computed based on service cost and/or opportunity cost) is less than the baseline, the system may instead have the third-party service center service the autonomous vehicle. In certain situations, even if the service cost of a third-party service center may be higher than that of the selected affiliated service center, the cost difference may be offset by savings in opportunity cost (e.g., the third-party service center may be significantly closer to the autonomous vehicle and/or may require less wait time). After the system selects a service center (whether affiliated or third-party), the system may, at step 330, determine an appropriate mode in which the vehicle should be instructed to operate.

Returning to step 300, another type of target objective may be to rebalance the distribution of autonomous vehicles servicing particular geographic regions. In particular embodiments, the system may know the anticipated demand from particular geographic regions based on historical usage patterns and other statistical data. For example, the system may know that demand typically peaks during morning commute, evening commute, and Friday and Saturday nights, and drops significantly at other times. Based on such knowledge, the system may predict transportation demand in particular regions at particular times. The anticipated demand in a region may then be compared to the supply of vehicles servicing that region to determine whether reallocation of vehicles is desirable. For example, if the supply exceeds demand in that region, the system may determine that a certain number of vehicles should drive to another region where demand exceeds supply. Conversely, if demand exceeds supply, the system may request vehicles from other regions with excess supply to relocate to service the current region. In particular embodiments, the objective of rebalancing may additionally or alternatively be based on redistributing vehicles with respect to service centers. For example, each service center for servicing vehicles within the fleet may be assigned a service region. The size of the service region may be based on the capacity of the servicing center(s) within it, as well as the service center's efficiency, availability, and capabilities, for example. To avoid a service center becoming the bottleneck for getting vehicles back on the road, the system may periodically rebalance the distribution of its fleet to maintain an acceptable ratio of vehicles to service center capacity within each service region. Thus, if the system determines that a particular service region has too many vehicles, the system may redirect the vehicles to other regions with servicing capacity.

Upon the system determining (step 305) that a target objective of rebalancing the fleet distribution exists, it may proceed with identifying particular autonomous vehicles and assign them to particular geographic regions (step 308). As described above, the system may determine that the concentration of autonomous vehicles within particular regions may be suboptimally high or low. To adjust fleet distribution, the system may instruct certain vehicles from identified source regions with excess vehicles to relocate to other destination regions needing vehicles. In particular embodiments, the system may select source and destination regions based on their relative proximity. For instance, if a source region has 10 excess vehicles, the system may rank candidate destination regions needing vehicles based on their relative proximity to the source region, with the closer destination regions being ranked higher. If the closest destination region needs 2 vehicles and the second-closest destination region needs 15 vehicles, the system may assign, from the source region, 2 vehicles to the closest region and 8 vehicles to the second-closest region. In particular embodiments, the system may select particular vehicles to relocate based on, e.g., their availability (e.g., vehicles not currently transporting passengers may be preferred), trajectory (e.g., vehicles that are heading in the direction of the destination region are preferred), proximity to the destination region (e.g., vehicles that are currently closer to the destination region are preferred), vehicle features (e.g., vehicles with features satisfying particular anticipated demand are preferred, such as trim level, number of passenger seats, etc.), and any other suitable considerations. Once a destination region is assigned to a vehicle, reaching that destination region may be considered a target objective of the vehicle. The system may then proceed to step 330 to determine an appropriate operational mode.

At step 330, the transportation management system may determine an appropriate mode in which the vehicle should be instructed to operate. In particular embodiments, there may be a no-passenger mode, a destination mode, and an incentive mode, each of which will be described in turn and in further detail below.

A vehicle operating in the no-passenger mode may drive directly to its target destination without transporting passengers. In particular embodiments, a vehicle may operate under such mode if the system determines that it is unsafe for the vehicle to transport passengers, even though it may be sufficiently capable of driving autonomously. The determination may be based on the risk factor score computed based on the vehicle's current conditions. For example, a risk factor score within a first score range (e.g., low risk) may indicate that the vehicle may transport passengers safely; a score within a second range (e.g., medium risk) may indicate that the vehicle is unsafe to transport passengers but is sufficiently safe to drive autonomously; and a score between a third range (e.g., high risk) may indicate that the vehicle should no longer drive autonomously. Aside from risk factors, the system may select a mode of operation based on an urgency score representing the urgency of having the vehicle fulfil its target objective. For example, even if the vehicle could presently operate, it may not be able to soon (e.g., it may run out of fuel, its tire has been punctured and tire pressure is dropping, etc.). Thus, if vehicle conditions impose a timeframe of operability, the urgency score may be higher. As another example, certain rebalancing objectives may be triggered due to an anticipated spike in demand in a particular geographic region. An urgency score may therefore reflect how soon the anticipated demand would spike, taking into consideration the distance between the destination region and the vehicle. In situations where the urgency score is high, the system may instruct the vehicle to operate in no-passenger mode and drive to the target destination as soon as possible. As yet another example in which the no-passenger mode may be suitable is when the system determines that the vehicle is sufficiently close to a service center (e.g., for vehicle maintenance) or destination region (e.g., for rebalancing fleet distribution). In addition, the transportation management system may also determine that the vehicle should not transport passengers due to quality-of-service concerns, as doing so may harm the reputation of the fleet. For example, the quality-of-service may relate to cleanliness (e.g., a previous passenger may have eaten messily in the vehicle), or the vehicle's impairment may limit its capabilities (e.g., driving within a lowered speed limit, avoiding highways/freeways, no air conditioning or entertainment, etc.). For any of these reasons, at step 335 the transportation management system may instruct the autonomous vehicle to drive directly to a candidate service center or destination region directly. Once the vehicle arrives, at step 399 the vehicle may be serviced or resume/being normal operations.

Returning to step 330, instead of selecting no-passenger mode, the transportation management system may instead determine that the vehicle could transport passengers while furthering its target objective. For example, the system may determine that the vehicle is sufficiently safe to transport passengers despite needing to be serviced, and/or that the urgency in reaching the target destination is not great. As a result, the transportation management system may, in particular embodiments, select to operate in destination mode (illustrated as starting from step 340) or incentive mode (illustrated as starting from step 360), or any other suitable mode. Conceptually, in destination mode, the transportation management system may seek to match the autonomous vehicle with ride requestors who are going in the general direction towards the target destination (e.g., service center or target service region). In incentive mode, the transportation management system may provide offers or incentives to entice ride requestors to agree to using a particular autonomous vehicle that is fulfilling a target objective. In particular embodiments, the transportation management system may, by default, prefer to operate in destination mode rather than incentive mode, but may switch to incentive mode if destination mode is unsuccessful (e.g., unable to match the vehicle with a ride request that would further the target objective).

In particular embodiments, the transportation management system may select between destination mode and incentive mode based on the risk factor score and/or urgency score. Since particular embodiments of incentive mode involve providing offers to ride requestors to entice them to accept a particular vehicle, it may be assumed that incentive mode would likely yield matches more quickly and/or the resulting rides would likely be more convenient for a vehicle (e.g., a more convenient route may be offered to the ride requestor). As such, incentive mode may be preferable in situations where fulfilling the target objective is time-sensitive or distance-sensitive. In addition, in situations where the vehicle's condition affects the ride experience (e.g., dirty, no air conditioning, no radio, slower, etc.), incentive mode may be preferable to compensate for such suboptimal conditions.

In particular embodiments, the mode selection process 330 may take into consideration a risk factor score that reflects the vehicle's condition and/or the associated risks. As previously described, in particular embodiments a particular range of risk factor scores may indicate that a vehicle may continue to transport passengers. Within that range there may be a lower subrange and a higher subrange, with the lower subrange representing better vehicle condition (e.g., more fuel, slower rate of tire-pressure loss, cleaner, etc.). Thus, in particular embodiments the system may operate in destination mode if a vehicle's risk factor score is within the lower range and operate in incentive mode if the score is within the higher range. For instance, if the fuel level of the vehicle is sufficiently high (e.g., battery is more than 30% charged) to not trigger the no-passenger mode but low enough to limit the vehicle's operability range, the system may determine that operating under incentive mode is preferable over destination mode to get the vehicle to a service center quickly.

The risk factor score may be computed based on a variety of factors. An example of a risk factor may relate to the safety risk to passengers or third parties (e.g., pedestrians, other drivers, homeowners living near streets, etc.). For instance, certain predetermined vehicle conditions may negatively impact safety, such as a flat tire, malfunctioning sensors, worn-out brakes, or any other conditions that may compromise the operational safety of the vehicle. In particular embodiments, the existence of such a risk to safety may cause the system to instruct the vehicle to stop and request for in-field assistance or to drive slowly to the closest service center. Another risk factor relates to the risk of additional loss of function, which refers to certain conditions that are likely to degrade as time progresses. For instance, while certain conditions (e.g., low tire pressure, low fuel, thinning brake pads, etc.) may not immediately impact a vehicle's driving ability or safety, such conditions are likely to degrade progressively with the passage of time until they start making a discernable impact on the functionality of the vehicle. As such, conditions that are likely to degrade further to the point that they impact the vehicle's functionality may warrant a higher risk factor score (which in turn may cause the vehicle to operate in incentive mode instead of destination mode). Other conditions that are unlikely to degrade further (e.g., a dirty sensor, cracked windshield, or cracked bumper) or to a point that would impact the vehicle's functionality may warrant a relatively lower risk factor score (which in turn may cause the vehicle to operate in destination mode instead of incentive mode). The risk factor score may also take into consideration conditions that are considered to be lower risk. For example, certain conditions may negatively affect the ride experience of the ride requestors. Examples of such conditions may include the vehicle being dirty or the vehicle's air conditioning system, entertainment system (e.g., audio or video system), or user interface (e.g., a computing console such as a tablet) for control features in the vehicle (e.g., interior temperature, audio volume, etc.) malfunctioning. In particular embodiments, different risk factors may be weighted differently. For example, the aforementioned risk factors, when listed in order of their respective weights (from high to low), may be: safety risk to passengers or third parties; risk of additional loss of function; and compromised passenger experience.

In particular embodiments, the risk factor score may be increased based on relevant environmental factors or context. For example, if a vehicle condition cannot be readily addressed or repaired by an in-field technician or at a nearby service center, the risk level associated with that vehicle condition may be increased since the vehicle would have to travel farther or wait longer to be serviced. As another example, the risk factor score may be increased if the time window available for getting a vehicle serviced is closing due to the time of day or day of the week (e.g., an issue was detected at 4:00 PM and service centers close on Sundays at 5:00 PM) or made harder due to weather or traffic conditions.

In particular embodiments, the mode selection process 330 may additionally or alternatively take into consideration an urgency score that reflects any rationale for expediting the completion of the target objective. Different ranges of urgency score may be defined to reflect high urgency, medium urgency, and low urgency. No-passenger mode may be suitable in high urgency situations in order to get the vehicle to the target destination as quickly as possible. Destination mode may be suitable when urgency is low since the vehicle has time to accommodate different ride requests and more passively (relative to incentive mode) move towards the target destination. Incentive mode may be suitable when urgency is at a medium level since the vehicle has time to fulfil ride requests, but the moderate urgency warrants the system to be more aggressive in finding suitable rides that would not overly inconvenience the vehicle. As described elsewhere herein, the urgency score may reflect, e.g., how soon demand would peak in the target destination region, how soon the window for servicing the vehicle would close at the target service center, how much longer the vehicle may drive based on its fuel level, etc.

In particular embodiments, the selection between destination mode and incentive mode may be based on certain appreciable quality-of-service considerations. For example, the system may select to operate in destination mode when the quality of service is not negatively impacted by the service needs (e.g., fuel level, tire pressure, engine oil level, etc.), and may select to operate in incentive mode when the quality of service is negatively impacted in order to compensate the passenger for the inconvenience (e.g., cleanliness, reduced driving speed, etc.).

If the system selects destination mode, the system may, at step 340, attempt to match the autonomous vehicle with ride requestors based on one or more criteria. In particular embodiments, the transportation management system may, at or near the time when the matching process is performed, receive a plurality of ride requests from a plurality of ride requestors, respectively. Each of the plurality of ride requests may indicate an origination location and a destination location desired by the ride requestor. In particular embodiments, the transportation management system may match the autonomous vehicle to a ride request based on the location of the autonomous vehicle, the origination location and destination location associated with the ride request, and/or the location(s) of the target destination (e.g., candidate service center(s) for servicing the vehicle or destination region).

Conceptually, a suitable match may be one that advances the target objective, such as getting the autonomous vehicle closer to the target destination (e.g., specific candidate service center or any one of a selection of candidate service centers, destination region, etc.). In particular embodiments, the matching process may involve determining, for each pending ride request that may feasibly be serviced by the vehicle, (1) whether the autonomous vehicle is sufficiently close to the origination location of the ride request (e.g., this may be based on an estimated proximity between the two being within a predetermined threshold or percentage), and (2) whether the destination location of the ride request would sufficiently (e.g., by a threshold amount or percentage) decrease the estimated proximity between the vehicle and the target destination or the estimated minimum proximity between the vehicle and the selection of target destinations (e.g., candidate service centers or destination regions). As an example, the transportation management system may determine, for each candidate service center (or each destination region), an original route from the autonomous vehicle to that candidate service center (or region), along with an associated estimated proximity (e.g., travel time or distance to the service center or any representative point within the destination region). For instance, if there are two candidate service centers, Service Center A and Service Center B, the system may determine that the proximity to A is 10 minutes and the proximity to B is 15 minutes, and therefore the closest candidate service center is 10 minutes away. Then for each ride request (which may be limited to those that are sufficiently close to the vehicle), the transportation management system may further determine a post-transportation route, along with an associated estimated proximity (e.g., travel time or distance), from the destination location of the ride request to each candidate service center. For example, the system may determine that, after dropping off the passenger, it would take 20 minutes to reach Service Center A and 7 minutes to reach Service Center B. Since the closest candidate service center after fulfilling the ride request is 7 minutes away compared to the original closest service center which was 10 minutes away, the system may determine that fulfilling the ride request would advance the target objective. In particular embodiments, a ranking model may also be used to rank the ride requests based on such metrics (e.g., proximity to the closest service center or destination region after fulfilling a ride request). For example, a ride request may be ranked higher relative to its peers if its origination location is closer to the vehicle and its destination location is closer to a candidate service center/ region (these metrics may be weighted differently in particular embodiments).

In particular embodiments, the matching process may be based on whether the detour cost of transporting a passenger while the vehicle is en route to a candidate service center (or region) is sufficiently small. For example, the transportation management system may determine, for each candidate service center, a direct route from the autonomous vehicle to that candidate service center (or any representative point within a region), along with an associated estimated proximity (e.g., travel time or distance). For instance, if there are two candidate service centers, A and B, the system may determine that the proximity to A is 10 minutes and the proximity to B is 15 minutes. Then for each candidate service center and each ride request (which may be limited to those that are sufficiently close to the vehicle), the transportation management system may further determine a detour route, along with an associated estimated proximity (e.g., travel time or distance), from the location of the autonomous vehicle to the origination location of the ride request, to the destination location of the ride request, and to the location of candidate service center. For example, the system may determine that taking a detour to fulfill a ride request and then proceeding to Service Center A would take a total of 23 minutes and proceeding to Service Center B would take a total of 16 minutes. To determine whether a particular ride request is sufficiently convenient in terms of getting the vehicle to a candidate service center or destination region, the system may compare the proximities of the detour routes to that of the corresponding direct routes. Continuing the example above, the system may recognize that, for reaching Service Center A, fulfilling the ride request would incur a detour cost of 23 minutes−10 minutes=13 minutes, and that for reaching Service Center B the detour cost would be 16 minutes−15 minutes=1 minute. If the difference in proximity is sufficiently small (e.g., relative to a threshold) for any of the candidate service center, then the ride request may be a candidate match. Thus, continuing the example above, the system may determine that fulfilling the ride request is acceptable since it may only incur a detour cost of 1 minute for at least one of the candidate service centers. In particular embodiments, a ranking model may rank the candidate ride requests based on the detour cost, and the ranking result may be used to determine which ride request should be matched to the autonomous vehicle.

At step 345, the transportation management system may determine whether a suitable match is found. As described above, the system may determine that a match is found if fulfilling a ride request would advance the target objective or doing so would add minimal cost (e.g., which may be measured by travel time/distance, as described above). If no suitable ride request is found based on the matching criteria, then the transportation management system in particular embodiments may try incentive mode (beginning at step 360), which will be described in further detail below, or simply instruct the autonomous vehicle to go directly to the closest candidate service center (not shown) or destination region. If, on the other hand, a match is found, the transportation management system may, at step 350, instruct the autonomous vehicle to proceed with performing the task of fulfilling the transportation request (e.g., transporting passengers or goods from the origination location to the destination location).

At step 355, the transportation management system may determine whether the ride has been completed. For example, the transportation management system may periodically check whether the ride requestor has reached his/ her requested destination. The transportation management system may make such determination by comparing whether the ride provider's location and/or the ride requestor's location coincide with the destination. The determination may be based on GPS information provided by the ride requestor's mobile device and the autonomous vehicle. The transportation management system may also determine that a ride has completed based on a notification from the device of the ride requestor stating as such. For example, through an application installed on the device, the ride requestor may indicate that the ride has terminated. If the ride requestor gotten off the vehicle prematurely at a different location, the system may detect such an event based on divergence of the requestor and the vehicle's respective GPS locations. If the ride is not yet complete, the system may repeatedly check the status of the ride until it is complete.

In particular embodiments, after the ride request has been fulfilled, the transportation management system may, at step 358, assess whether the autonomous vehicle is sufficiently close (e.g., relative to a threshold) to its target destination (e.g., candidate service center or destination region). For example, based on the vehicle's current GPS location at the time of performing step 358, the transportation management system may determine the proximity between the vehicle and each suitable candidate service center in the area (or destination regions). If the proximity to any of the suitable candidate service centers (or destination region) is sufficiently close (e.g., within a threshold distance or travel time), then in particular embodiments the system may simply instruct the vehicle drive directly to that service center (step 335) and receive service (step 399) (or to that destination region and begin normal/regular operation). On the other hand, if the system determines that the vehicle is not sufficiently close, it may repeat the destination mode matching process, beginning at step 340. In particular embodiments, this process may repeat any number of times until the vehicle is sufficiently close to a target destination. Alternatively, in other embodiments (not shown), the system may terminate destination mode and instruct the vehicle to go directly to the target destination if, e.g.: the vehicle has fulfilled a prescribed threshold number of ride requests (e.g., 1, 3, 5, etc.); the vehicle's condition has deteriorated such that it is no longer suitable for it to transport passengers; or the transportation management system determined or predicted that the demand for transportation would be sufficiently within the current supply of available autonomous vehicles in the area (and therefore other vehicles without target objectives may fulfill the transportation demands). In particular embodiments, while the vehicle is en route to its target destination, the system may periodically (e.g., after a certain travel distance and/or time) reassess whether any of the current ride requests may be a good match for the vehicle (e.g., repeating the process starting from step 330).

In particular embodiments, the transportation management system may elect to operate in incentive mode to incentivize ride requestors to agree to being transported by an autonomous vehicle that is fulfilling a target objective. As previously noted, the system may determine that incentive mode is appropriate during the mode selection process at step 330. In particular embodiments, incentive mode may also be invoked if the system has trouble finding a match (step 345) when operating in destination mode. Matching difficulties may be due to, for example, strict matching requirements that assume the ride request's origination and destination locations are essentially immutable, thus resulting in the origination location not being within a threshold proximity from the vehicle and/or the destination location not being sufficiently along the vehicle's route to a service center. Matching may also be difficult in embodiments where ride requestors are informed of the vehicles' impairments, and as a result ride requestors may decline being transported by such vehicles. The incentive mode is designed to address such matching problems by incentivizing riders to agree to adjustments in the origination and/or destination locations as well as being serviced by a vehicle whose condition is less than perfect.

In particular embodiments, the incentive mode may begin at step 360, where the transportation management system may identify candidate ride requestors for an autonomous vehicle with a target objective (e.g., reaching a service center or relocating to a different service region). In particular embodiments, the system may identify candidate ride requestors in a manner similar to the matching algorithm described with reference to step 340 above. Conceptually, the system may identify a pool of candidate ride requestors who are sufficiently close to the vehicle and/or want to travel in a direction that would bring the vehicle closer to its target destination. As described in more detail above, whether transporting a particular ride requestor is convenient for the vehicle may be based on, e.g., the proximity (e.g., distance and travel time) between the vehicle and the ride requestor's origination location, the proximity between the vehicle and its target destination (e.g., service center) once the vehicle drops the requestor off, the detour cost of transporting the ride requestor, among other metrics. In particular embodiments, since the system may offer incentives for a ride requestor to accommodate the needs of the vehicle, the system may relax the metrics for identifying candidate ride requestors (e.g., increasing the threshold proximity, wait time, and/or detour cost). Relaxing the metric may result in a larger pool of candidates than there would be otherwise. For example, in destination mode, a ride requestor who is more than 5 minutes away from the vehicle may be excluded from being matched with the vehicle. In incentive mode, however, the maximum threshold travel time may be 10 minutes instead, and as such the same ride requestor would remain a possible match.

At step 365, the transportation management system may determine what compromising ride conditions should be offered to each of the candidate ride requestors. The compromising condition may be that the vehicle is dirty or operating under certain limitations (e.g., speed restriction) due to the impairment. As another example, the compromising condition may be a longer than usual pickup time. For instance, the system may determine that a particular ride requestor's origination and destination locations are along the vehicle's route to a target destination, but due to the current proximity between the vehicle and the origination location, the ride requestor would need to wait longer to be picked up. In this case, the system may send the ride requestor an offer (e.g., monetary discounts, gifts, upgraded vehicle, etc.) to entice him/her to agree to wait for the vehicle, rather than dispatching a different vehicle that is closer to the requestor (if any).

As another example, the compromising condition may be related to adjusting the origination location and/or destination location. For instance, if a particular ride requestor's origination location is too far from the vehicle (e.g., relative to a threshold proximity) or the added detour cost would be too high to pick up the requestor, the system may determine whether there exists an alternative origination location sufficiently close (e.g., within a threshold proximity) to the original origination location that would be more convenient for the vehicle and not overly inconvenience the ride requestor. The alternative origination location may be determined, for example, by comparing the original origination location with the vehicle's route to the target destination and determining whether it is feasible (e.g., within a threshold distance or time) for the ride requestor to walk to the closest point along the vehicle's route (e.g., crossing the street or relocating to a different block/street for pickup). As another example, the system may identify potential alternative origination locations by, e.g., sampling several pickup locations within a threshold distance from the original origination location (e.g., within a 5 minute walking radius) and computing the detour cost to see if any of the detour cost is acceptable (e.g., within a threshold cost). Similarly, the system may also identify an alternative destination location that would be more convenient for the vehicle. For instance, the alternative destination location may be determined by finding the closest point along the vehicle's current route to the original destination location and determining whether that point is within a short walking distance from the original destination location. The alternative destination route may also be determined by sampling various alternative destination locations within a threshold distance from the original destination location and seeing if any of the associated detour cost is sufficiently low (e.g., within a predetermined threshold cost). If a suitable alternative origination location and/or destination location is found, the system may send an offer to the ride requestor to entice him/her to agree to using the suggested alternative origination location and/or the alternative destination location.

In particular embodiments, the transportation management system may determine the proper incentive based on, e.g., the amount of extra time that the ride requestor needs to wait, the proximity between the original and alternative origination/destination location(s), extra travel time due to the alternative route, the dirtiness level of the vehicle, the extent of the vehicle's limitations due to impairments, and/or any other compromising condition that the system is asking the ride requestor to accept. In particular embodiments, the system may use machine-learning to determine the incentive to be offered. For example, a machine-learning model may be trained on a set of training data. Each training sample may include information about a ride request (e.g., origination location/destination, time and date, requestor profile, etc.), proposed compromising conditions (e.g., pickup delay, alternative locations, etc.), and offer (e.g., discount amount, gift, etc.) that was accepted or rejected by the ride requestor. The machine-learning model may be trained to take as input, e.g., information about a given ride request and proposed compromising conditions, and output an offer that would likely be accepted (e.g., discount amount, gift type and quantity, etc.).

At step 370, the transportation management system may offer the incentive and information relating to the compromised conditions to the candidate ride requestors. In particular embodiments, a description of the compromising conditions and the offer may be presented on the ride requestor's device, along with a user interface allowing the ride requestor to accept or reject the offer (e.g., a button, sliding interface, checkbox, etc.). In particular embodiments, the ride requestor may also be presented with information pertaining to differences in travel distance and/or time between the offered ride and the ride that would be otherwise dispatched if the requestor rejects the offer. For example, the system may inform the ride requestor that by accepting the offer, he may have to wait an additional x minutes, walk for an additional y minutes/miles to the alternative origination location and/or from the alternative destination location, or ride in the vehicle for an extra z minutes due to the alternative route.

At step 375, the transportation management system may determine whether any of the candidate ride requestors accepted their respective offers. In particular embodiments, the system may send offers to the candidate ride requestors simultaneously and match the vehicle with the ride requestor who accepts the offer first. In particular embodiments, if no one accepts the offer after a threshold amount of time (e.g., 1 minute, 3 minutes, etc.), the system may attempt again by sending a revised, more incentivizing offer (e.g., more discount) to the candidate ride requestors. The system may iteratively send revised offers that are progressively more incentivizing (e.g., 10% off, 20% off, 30% off, and so on) until someone accepts the offer or until a threshold incentive level is reached (e.g., a maximum discount of 50%). In other embodiments, if the target objective is not urgent, the offers may be sent to candidate ride requestors one by one as long as the offer is being rejected, until someone accepts the offer or until one or more predetermined terminating criteria are met (e.g., after a threshold number of offers have been sent and/or rejected or after a threshold period of time). In particular embodiments, if none of the candidate ride requestors accepts the offers and the criteria for terminating the offer attempts have been reached, then the system may instruct the autonomous vehicle to drive directly to the target service center (e.g., step 335), and may reassess periodically whether any current ride requests would be a suitable match for the vehicle (e.g., repeating the process from step 330). On the other hand, if the offer is accepted by a ride requestor, the system may then instruct the vehicle (e.g., step 380) to fulfill the accepted transportation arrangement. This may involve, for example, instructing the vehicle to take a detour to pick-up and drop-off the ride requestor at the agreed upon origination and destination locations.

At step 383, the transportation management system may periodically check whether the ride has completed, in a manner similar to that described with reference to step 355. Upon determining that the ride is complete (e.g., based on GPS location comparisons or completion notifications from the vehicle and/or the ride requestor), the system may, at step 385, determine whether the vehicle's current location is sufficiently close to the target destination (e.g., one of candidate service centers), in a manner similar to that described with reference to step 358. In particular embodiments, if the vehicle is sufficiently close, then the system may instruct the autonomous vehicle to drive directly to the target destination (e.g., step 335). If, on the other hand, the vehicle is not sufficiently close, the system may return to step 330 to determine which mode to operate under. In particular embodiments, the system may, by default, try destination mode first and then try incentive mode. In other embodiments, the default may instead be to repeat incentive mode. Either way, the system may try to match additional ride requests with the vehicle so that the vehicle may continue to be productive servicing ride requestors while further its target objective. If matching is unsuccessful, the system may instruct the vehicle to drive to the target destination directly.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for dispatching autonomous vehicles to advance target objectives, including the particular steps of the method of FIG. 3, this disclosure contemplates any suitable method for dispatching autonomous vehicles to advance target objectives, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
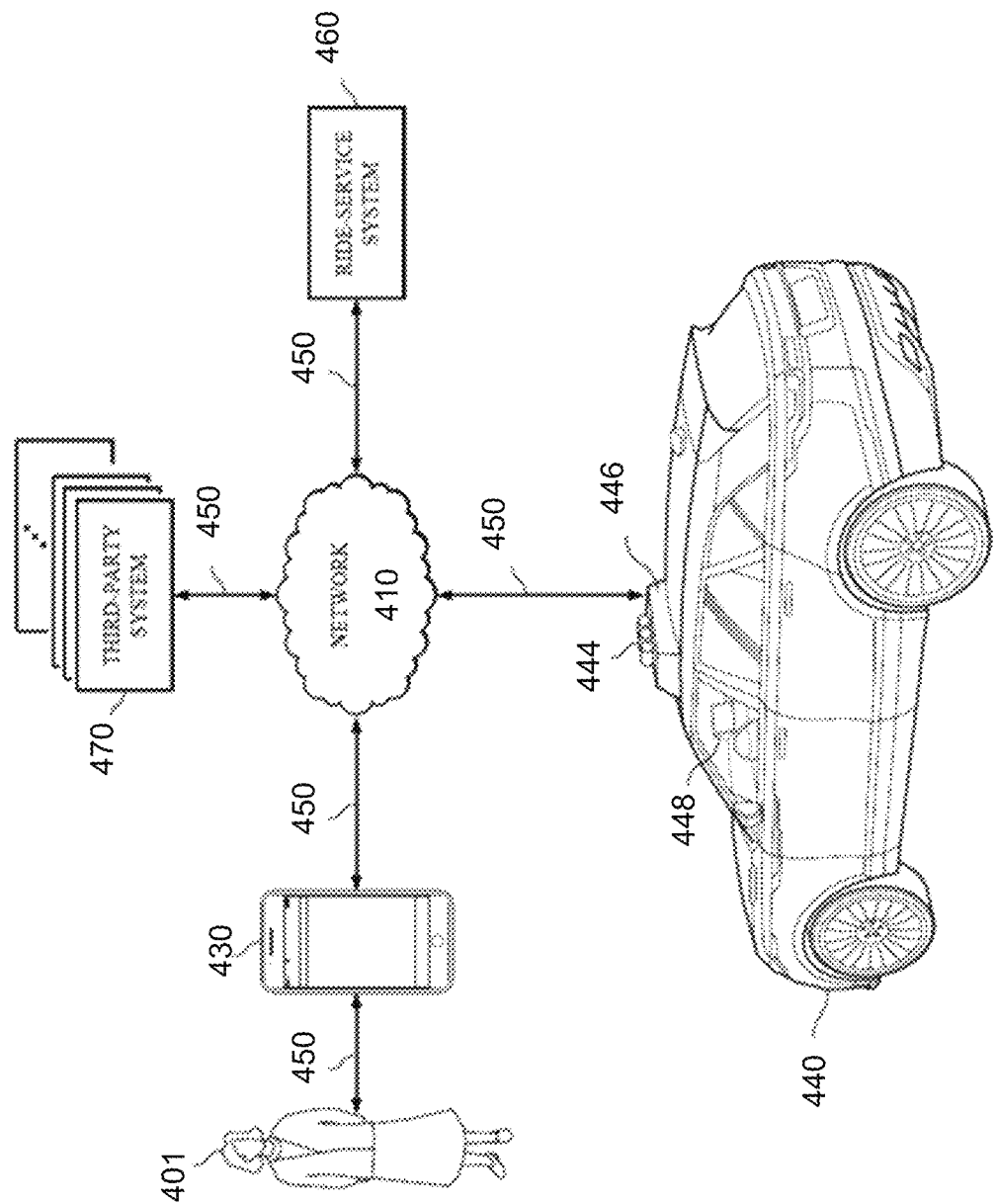
FIG. 4 illustrates an example block diagram of a transportation management environment for matching ride requestors with autonomous vehicles.

FIG. 4 illustrates an example block diagram of a transportation management environment for matching ride requestors with autonomous vehicles. In particular embodiments, the environment may include various computing entities, such as a user computing device 430 of a user 401 (e.g., a ride provider or requestor), a transportation management system 460, an autonomous vehicle 440, and one or more third-party system 470. The computing entities may be communicatively connected over any suitable network 410. As an example and not by way of limitation, one or more portions of network 410 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 4 illustrates a single user device 430, a single transportation management system 460, a single vehicles 440, a plurality of third-party systems 470, and a single network 410, this disclosure contemplates any suitable number of each of these entities. As an example and not by way of limitation, the network environment may include multiple users 401, user devices 430, transportation management systems 460, autonomous-vehicles 440, third-party systems 470, and networks 410.

The user device 430, transportation management system 460, autonomous vehicle 440, and third-party system 470 may be communicatively connected or co-located with each other in whole or in part. These computing entities may communicate via different transmission technologies and network types. For example, the user device 430 and the vehicle 440 may communicate with each other via a cable or short-range wireless communication (e.g., Bluetooth, NFC, WI-FI, etc.), and together they may be connected to the Internet via a cellular network accessible to either one of the devices (e.g., the user device 430 may be a smartphone with LTE connection). The transportation management system 460 and third-party system 470, on the other hand, may be connected to the Internet via their respective LAN/WLAN networks and Internet Service Providers (ISP). FIG. 4 illustrates transmission links 450 that connect user device 430, autonomous vehicle 440, transportation management system

460, and third-party system 470 to communication network 410. This disclosure contemplates any suitable transmission links 450, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 450 may connect to one or more networks 410, which may include in part, e.g., ad hoc network, the Intranet, extranet, VPN, LAN, WLAN, WAN, WWAN, MAN, PSTN, a cellular network, a satellite network, or any combination thereof. The computing entities need not necessarily use the same type of transmission link 450. For example, the user device 430 may communicate with the transportation management system via a cellular network and the Internet, but communicate with the autonomous vehicle 440 via Bluetooth or a physical wire connection.

In particular embodiments, the transportation management system 460 may fulfill ride requests for one or more users 401 by dispatching suitable vehicles. The transportation management system 460 may receive any number of ride requests from any number of ride requestors 401. In particular embodiments, a ride request from a ride requestor 401 may include an identifier that identifies the ride requestor in the system 460. The transportation management system 460 may use the identifier to access and store the ride requestor's 401 information, in accordance with his/her privacy settings. The ride requestor's 401 information may be stored in one or more data stores (e.g., a relational database system) associated with and accessible to the transportation management system 460. In particular embodiments, ride requestor information may include profile information about a particular ride requestor 401. In particular embodiments, the ride requestor 401 may be associated with one or more categories or types, through which the ride requestor 401 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 460 may classify a user 401 based on known information about the user 401 (e.g., using machine-learning classifiers), and use the classification to retrieve relevant aggregate information associated with that class. For example, the system 460 may classify a user 401 as a young adult and retrieve relevant aggregate information associated with young adults, such as the type of music generally preferred by young adults.

Transportation management system 460 may also store and access ride information. Ride information may include locations related to the ride, traffic data, route options, optimal pick-up or drop-off locations for the ride, or any other suitable information associated with a ride. As an example and not by way of limitation, when the transportation management system 460 receives a request to travel from San Francisco International Airport (SFO) to Palo Alto, California, the system 460 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 460. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 460. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to news, etc. As yet another example, historical data associated with all users may include general usage trends, such as traffic and ride patterns. Using historical data, the system 460 in particular embodiments may predict and provide ride suggestions in response to a ride request. In particular embodiments, the system 460 may use machine-learning, such as neural-networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 460 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 460 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or other suitable database system. Although this disclosure describes or illustrates particular types of databases, this disclosure contemplates any suitable types of databases. Particular embodiments may provide interfaces that enable a user device 430 (which may belong to a ride requestor or provider), a transportation management system 460, vehicle system 440, or a third-party system 470 to process, transform, manage, retrieve, modify, add, or delete the information stored in data store.

In particular embodiments, transportation management system 460 may include an authorization server (or other suitable component(s)) that allows users 401 to opt-in to or opt-out of having their information and actions logged, recorded, or sensed by transportation management system 460 or shared with other systems (e.g., third-party systems 470). In particular embodiments, a user 401 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 401 of transportation management system 460 through blocking, data hashing, anonymization, or other suitable techniques as appropriate.

In particular embodiments, third-party system 470 may be a network-addressable computing system that may provide HD maps or host GPS maps, customer reviews, music or content, weather information, or any other suitable type of information. Third-party system 470 may generate, store, receive, and send relevant data, such as, for example, map data, customer review data from a customer review website, weather data, or any other suitable type of data. Third-party system 470 may be accessed by the other computing entities of the network environment either directly or via network 410. For example, user device 430 may access the third-party system 470 via network 410, or via transportation management system 460. In the latter case, if credentials are required to access the third-party system 470, the user 401 may provide such information to the transportation management system 460, which may serve as a proxy for accessing content from the third-party system 470.

In particular embodiments, through the network 410, the transportation management system 460 or third-party system 470 may receive sensor data, associated metadata, object classifications, and/or environmental data from the autonomous vehicles 440. In particular embodiments, the transportation management system 460 or third-party system 470 may also send autonomous vehicles 440 an HD map, map data associated with a particular location, latent representation of data associated with a particular location, and/or instructions for local map updates.

In particular embodiments, user device 430 may be a mobile computing device such as a smartphone, tablet computer, or laptop computer. User device 430 may include one or more processors (e.g., CPU and/or GPU), memory, and storage. An operation system and applications may be installed on the user device 430, such as, e.g., a transportation application associated with the transportation management system 460, applications associated with third-party systems 470, and applications associated with the operating system. User device 430 may include functionality for determining its location, direction, or orientation, based on integrated sensors such as GPS, compass, gyroscope, or accelerometer. User device 430 may also include wireless transceivers for wireless communication, and may support wireless communication protocols such as Bluetooth, near-field communication (NFC), infrared (IR) communication, WI-FI, and/or 2G/3G/4G/LTE mobile communication standard. User device 430 may also include one or more cameras, scanners, touchscreens, microphones, speakers, and any other suitable input-output devices.

In particular embodiments, the vehicle 440 may be an autonomous vehicle and equipped with an array of sensors 444, a navigation system 446, and a ride-service computing device 448. In particular embodiments, a fleet of autonomous vehicles 440 may be managed by the transportation management system 460. The fleet of autonomous vehicles 440, in whole or in part, may be owned by the entity associated with the transportation management system 460, or they may be owned by a third-party entity relative to the transportation management system 460. In either case, the transportation management system 460 may control the operations of the autonomous vehicles 440, including, e.g., dispatching select vehicles 440 to fulfill ride requests, instructing the vehicles 440 to perform select operations (e.g., head to a service center or charging/fueling station, pull over, stop immediately, self-diagnose, lock/unlock compartments, change music station, change temperature, and any other suitable operations), and instructing the vehicles 440 to enter select operation modes (e.g., operate normally, drive at a reduced speed, drive under the command of human operators, and any other suitable operational modes).

In particular embodiments, the autonomous vehicles 440 may receive data from and transmit data to the transportation management system 460 and the third-party system 470. Example of received data may include, e.g., instructions, new software or software updates, maps, 3D models, trained or untrained machine-learning models, location information (e.g., location of the ride requestor, the autonomous vehicle 440 itself, other autonomous vehicles 440, and target destinations such as service centers), navigation information, traffic information, weather information, entertainment content (e.g., music, video, and news) ride requestor information, ride information, and any other suitable information. Examples of data transmitted from the autonomous vehicle 440 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 440, passengers may send/receive data to the transportation management system 460 and/or third-party system 470), and any other suitable data.

In particular embodiments, autonomous vehicles 440 may also communicate with each other as well as other traditional human-driven vehicles, including those managed and not managed by the transportation management system 460. For example, one vehicle 440 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 460 or third-party system 470).

In particular embodiments, an autonomous vehicle 440 may obtain and process sensor/telemetry data. Such data may be captured by any suitable sensors. For example, the vehicle 440 may have aa Light Detection and Ranging (LiDAR) sensor array of multiple LiDAR transceivers that are configured to rotate 360°, emitting pulsed laser light and measuring the reflected light from objects surrounding vehicle 440. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 440. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 440 may have optical cameras pointing in different directions. The cameras may be used for, e.g., recognizing roads, lane markings, street signs, traffic lights, police, other vehicles, and any other visible objects of interest. To enable the vehicle 440 to "see" at night, infrared cameras may be installed. In particular embodiments, the vehicle may be equipped with stereo vision for, e.g., spotting hazards such as pedestrians or tree branches on the road. As another example, the vehicle 440 may have radars for, e.g., detecting other vehicles and/or hazards afar. Furthermore, the vehicle 440 may have ultra sound equipment for, e.g., parking and obstacle detection. In addition to sensors enabling the vehicle 440 to detect, measure, and understand the external world around it, the vehicle 440 may further be equipped with sensors for detecting and self-diagnosing the its own state and condition. For example, the vehicle 440 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieving using any combination of sensors. For example, an autonomous vehicle 440 may build a 3D model of its surrounding based on data from its LiDAR, radar, sonar, and cameras, along with a pre-generated map obtained from the transportation management system 460 or the third-party system 470. Although sensors 444 appear in a particular location on autonomous vehicle 440 in FIG. 4, sensors 444 may be located in any suitable location in or on autonomous vehicle 440. Example locations for sensors include the front and rear bumpers, the doors, the front windshield, on the side paneling, or any other suitable location.

In particular embodiments, the autonomous vehicle 440 may be equipped with a processing unit (e.g., one or more CPUs and GPUs), memory, and storage. The vehicle 440 may thus be equipped to perform a variety of computational and processing tasks, including processing the sensor data, extracting useful information, and operating accordingly. For example, based on images captured by its cameras and a machine-vision model, the vehicle 440 may identify particular types of objects captured by the images, such as pedestrians, other vehicles, lanes, curbs, and any other objects of interest.

In particular embodiments, the autonomous vehicle 440 may have a navigation system 446 responsible for safely navigating the autonomous vehicle 440. In particular embodiments, the navigation system 446 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 446 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 446 may use its determinations to control the vehicle 440 to operate in prescribed manners and to guide the autonomous vehicle 440 to its destinations without colliding into other objects. Although the physical embodiment of the navigation system 446 (e.g., the processing unit) appears in a particular location on autonomous vehicle 440 in FIG. 4, navigation system 446 may be located in any suitable location in or on autonomous vehicle 440. Example locations for navigation system 446 include inside the cabin or passenger compartment of autonomous vehicle 440, near the engine/battery, near the front seats, rear seats, or in any other suitable location.

In particular embodiments, the autonomous vehicle 440 may be equipped with a ride-service computing device 448, which may be a tablet or other suitable device installed by transportation management system 460 to allow the user to interact with the autonomous vehicle 440, transportation management system 460, other users 401, or third-party systems 470. In particular embodiments, installation of ride-service computing device 448 may be accomplished by placing the ride-service computing device 448 inside autonomous vehicle 440, and configuring it to communicate with the vehicle 440 via a wire or wireless connection (e.g., via Bluetooth). Although FIG. 4 illustrates a single ride-service computing device 448 at a particular location in autonomous vehicle 440, autonomous vehicle 440 may include several ride-service computing devices 448 in several different locations within the vehicle. As an example and not by way of limitation, autonomous vehicle 440 may include four ride-service computing devices 448 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 448 may be detachable from any component of autonomous vehicle 440. This may allow users to handle ride-service computing device 448 in a manner consistent with other tablet computing devices. As an example and not by way of limitation, a user may move ride-service computing device 448 to any location in the cabin or passenger compartment of autonomous vehicle 440, may hold ride-service computing device 448 in his/her lap, or handle ride-service computing device 448 in any other suitable manner. Although this disclosure describes providing a particular computing device in a particular manner, this disclosure contemplates providing any suitable computing device in any suitable manner.

Figure 5:
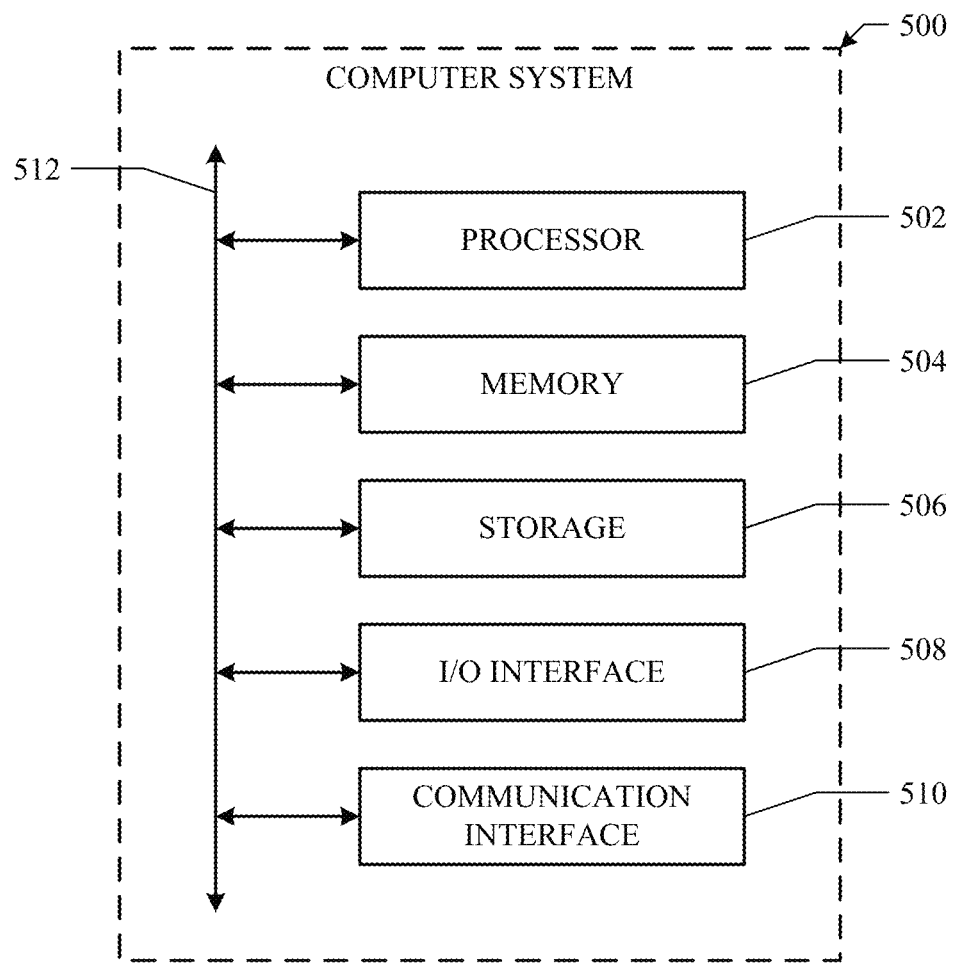
FIG. 5 illustrates an example of a computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described in further detail below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    determining a fleet-level objective for a vehicle, wherein the fleet-level objective is associated with instructing the vehicle to travel a route according to route criteria based on the fleet-level objective;
    receiving a ride request from a ride requestor, wherein the ride request is associated with ride criteria including at least a pick-up location and a drop-off location;
    determining (1) an urgency score indicative of an urgency to fulfill the fleet-level objective and (2) a risk factor score indicative of an overall condition of the vehicle;
    based on (1) the urgency score and (2) the risk factor score, determining that the vehicle is suitable to operate in an incentive mode while fulfilling the fleet-level objective, wherein the incentive mode comprises incentivizing the ride requestor to accept one or more modifications to the ride criteria associated with the ride request so as to fulfill the fleet-level objective;
    responsive to determining that the vehicle is suitable to operate in the incentive mode, providing one or more incentives to the ride requestor contingent on acceptance of the one or more modifications to the ride criteria;
    after receiving, from the ride requestor, the acceptance of the one or more modifications to the ride criteria, modifying the ride criteria in accordance with the route criteria; and
    instructing the vehicle to transport the ride requestor based on the modified ride criteria so as to fulfill the fleet-level objective.

2. The method of claim 1, further comprising:
    modifying the pick-up location or the drop-off location associated with the ride request in accordance with the acceptance of the one or more modifications to the ride criteria; and
    instructing the vehicle to travel to the modified pick-up location to pick up the ride requestor or to travel to the modified drop-off location to drop off the ride requestor.

3. The method of claim 1, further comprising:
    prior to providing the one or more incentives to the ride requestor, identifying the vehicle as a candidate match to the ride request based on the pick-up location or the drop-off location associated with the ride criteria; and
    matching the vehicle to the ride request based on the acceptance of the one or more modifications to the ride criteria.

4. The method of claim 3 wherein identifying the vehicle as the candidate match to the ride request comprises:
    determining a proximity between a current location of the vehicle and the pick-up location;
    determining a proximity between the drop-off location and a location associated with fulfilling the fleet-level objective; or
    calculating a cost of detouring from the route to transport the ride requestor.

5. The method of claim 1, further comprising:
    identifying at least one of an alternative pick-up location or alternative drop-off location for the ride request; and
    wherein providing the one or more incentives to the ride requestor comprises providing the identified alternative pick-up location or the alternative drop-off location to the ride requestor in association with the one or more incentives.

6. The method of claim 5, wherein identifying the alternative pick-up location or the alternative drop-off location comprises:
    determining one or more candidate alternative pick-up locations or one or more candidate alternative drop-off locations;
    calculating a proximity between the one or more candidate alternative pick-up locations or the one or more candidate alternative drop-off locations and the route;
    calculating a proximity between the one or more candidate alternative pick-up locations or the one or more candidate alternative drop-off locations and the pick-up location or the drop-off location associated with the ride request; and
    selecting the alternative pick-up location or the alternative drop-off location based on the calculated proximities.

7. The method of claim 1, further comprising determining the one or more incentives based on:
    an excess wait time for the ride requestor before the ride requestor is picked up;
    a proximity between the pick-up location and an alternative pick-up location;
    a proximity between the drop-off location and an alternative drop-off location;
    an excess travel time for the ride requestor;
    a condition of the vehicle; or
    vehicle operation restrictions.

8. The method of claim 1, further comprising:
    receiving one or more additional ride requests corresponding to one or more additional ride requestors, each of the one or more additional ride requests being associated with respective ride criteria; and
    providing the one or more incentives to the one or more additional ride requestors contingent on acceptance of the one or more modifications to the ride criteria associated with the corresponding additional ride request; and
    wherein the vehicle is instructed to transport a first of the ride requestor or the one or more additional ride requestors to provide acceptance of the one or more modifications.

9. The method of claim 1, further comprising:
    determining the fleet-level objective for the vehicle based at least on a determined location associated with each vehicle in a fleet of vehicles.

10. The method of claim 1, wherein fulfilling the fleet-level objective comprises traveling to a location based on a geographic distribution of a fleet of vehicles, traveling to a service center, or traveling to a location to meet a quality-of-service standard.

11. The method of claim 1, further comprising:
    determining that the route criteria associated with the fleet-level objective of the vehicle correspond with the ride criteria associated with the ride request of the ride requestor; and
    determining that the vehicle is suitable to operate in a destination mode while fulfilling the fleet-level objective, wherein the destination mode comprises fulfilling the ride request of the ride requestor without the one or more modifications to the ride criteria associated with the ride request;

wherein determining that the vehicle is suitable to operate in a destination mode is based on one or more of (1) the urgency score, (2) the risk factor score, or (3) the determination that the route criteria associated with the fleet-level objective of the vehicle correspond with the ride criteria associated with the ride request of the ride requestor.

12. The method of claim 1, further comprising:
determining a no-passenger mode for the vehicle, wherein the no-passenger mode comprises instructing the vehicle to reach a target location associated with the fleet-level objective without fulfilling the ride request of the ride requestor;
wherein determining the no-passenger mode for the vehicle is based on one or more of (1) the urgency score or (2) the risk factor score.

13. A system comprising: one or more processors and one or more computer-readable non-transitory storage media coupled in communication with the one or more of the processors, the one or more computer-readable non-transitory storage media comprising instructions that, when executed by the one or more of the processors, are configured to cause the system to perform operations comprising:
determining a fleet-level objective for a vehicle, wherein the fleet-level objective is associated with instructing the vehicle to travel a route according to route criteria based on the fleet-level objective;
receiving a ride request from a ride requestor, wherein the ride request is associated with ride criteria including at least a pick-up location and a drop-off location;
determining (1) an urgency score indicative of an urgency to fulfill the fleet-level objective and (2) a risk factor score indicative of an overall condition of the vehicle;
based on (1) the urgency score and (2) the risk factor score, determining that the vehicle is suitable to operate in an incentive mode while fulfilling the fleet-level objective, wherein the incentive mode comprises incentivizing the ride requestor to accept one or more modifications to the ride criteria associated with the ride request so as to fulfill the fleet-level objective;
responsive to determining that the vehicle is suitable to operate in the incentive mode, providing one or more incentives to the ride requestor contingent on acceptance of the one or more modifications to the ride criteria;
after receiving, from the ride requestor, the acceptance of the one or more modifications to the ride criteria, modifying the ride criteria in accordance with the route criteria; and
instructing the vehicle to transport the ride requestor based on the modified ride criteria so as to fulfill the fleet-level objective.

14. The system of claim 13, wherein the instructions, when executed by the one or more of the processors, are configured to cause the system to perform operations further comprising:
modifying the pick-up location or the drop-off location associated with the ride request in accordance with the acceptance of the one or more modifications to the ride criteria; and
instructing the vehicle to travel to the modified pick-up location to pick up the ride requestor or to travel to the modified drop-off location to drop off the ride requestor.

15. The system of claim 13, wherein the instructions, when executed by the one or more of the processors, are configured to cause the system to perform operations further comprising:
prior to providing the one or more incentives to the ride requestor, identifying the vehicle as a candidate match to the ride request based on the pick-up location or the drop-off location associated with the ride criteria; and
matching the vehicle to the ride request based on the acceptance of the one or more modifications to the ride criteria.

16. The system of claim 15, wherein identifying the vehicle as the candidate match to the ride request comprises:
determining a proximity between a current location of the vehicle and the pick-up location;
determining a proximity between the drop-off location and a location associated with fulfilling the fleet-level objective; or
calculating a cost of detouring from the route to transport the ride requestor.

17. One or more computer-readable non-transitory storage media including instructions that, when executed, by one or more processors, are configured to cause the one or more processors to perform operations comprising:
determining a fleet-level objective for a vehicle, wherein the fleet-level objective is associated with instructing the vehicle to travel a route according to route criteria based on the fleet-level objective;
receiving a ride request from a ride requestor, wherein the ride request is associated with ride criteria including at least a pick-up location and a drop-off location;
determining (1) an urgency score indicative of an urgency to fulfill the fleet-level objective and (2) a risk factor score indicative of an overall condition of the vehicle;
based on (1) the urgency score and (2) the risk factor score, determining that the vehicle is suitable to operate in an incentive mode while fulfilling the fleet-level objective, wherein the incentive mode comprises incentivizing the ride requestor to accept one or more modifications to the ride criteria associated with the ride request so as to fulfill the fleet-level objective;
responsive to determining that the vehicle is suitable to operate in the incentive mode, providing one or more incentives to the ride requestor contingent on acceptance of the one or more modifications to the ride criteria;
after receiving, from the ride requestor, the acceptance of the one or more modifications to the ride criteria, modifying the ride criteria in accordance with the route criteria; and
instructing the vehicle to transport the ride requestor based on the modified ride criteria so as to fulfill the fleet-level objective.

18. The one or more computer-readable non-transitory storage media of claim 17, wherein the instructions are further configured to cause the one or more processors to perform operations further comprising:
modifying the pick-up location or the drop-off location associated with the ride request in accordance with the acceptance of the one or more modifications to the ride criteria; and
instructing the vehicle to travel to the modified pick-up location to pick up the ride requestor or to travel to the modified drop-off location to drop off the ride requestor.

19. The one or more computer-readable non-transitory storage media of claim 17, wherein the instructions are further configured to cause the one or more processors to perform operations further comprising:

prior to providing the one or more incentives to the ride requestor, identifying the vehicle as a candidate match to the ride request based on the pick-up location or the drop-off location associated with the ride criteria; and matching the vehicle to the ride request based on the acceptance of the one or more modifications to the ride criteria.

20. The one or more computer-readable non-transitory storage media of claim 19, wherein identifying the vehicle as the candidate match to the ride request comprises:

determining a proximity between a current location of the vehicle and the pick-up location;

determining a proximity between the drop-off location and a location associated with fulfilling the fleet-level objective; or calculating a cost of detouring from the route determined based on the fleet-level objective to transport the ride requestor.

* * * * *